United States Patent

Katchka

[15] 3,642,029
[45] Feb. 15, 1972

[54] DUAL VALVE CONTROL DEVICE

[72] Inventor: Jay R. Katchka, Long Beach, Calif.
[73] Assignee: Robertshaw Controls Company, Richmond, Va.
[22] Filed: Feb. 9, 1970
[21] Appl. No.: 9,741

[52] U.S. Cl. .................................... 137/629, 137/630.19
[51] Int. Cl. ........................................... F16k 1/54
[58] Field of Search ................. 137/629, 630.19, 630.22

[56] References Cited

UNITED STATES PATENTS

| | | | |
|---|---|---|---|
| 3,118,471 | 1/1964 | Wright | 137/630.19 |
| 3,194,268 | 7/1965 | Vicenzi et al. | 137/630.19 X |
| 3,275,035 | 9/1966 | Freeby et al. | 137/630.22 X |

FOREIGN PATENTS OR APPLICATIONS

| | | | |
|---|---|---|---|
| 95,904 | 11/1960 | Netherlands | 137/630.22 |

*Primary Examiner*—Robert G. Nilson
*Attorney*—Auzville Jackson, Jr., Robert L. Marben and Anthony A. O'Brien

[57] ABSTRACT

A dual valve arrangement wherein a pair of fixed valve seats are sequentially engaged by a corresponding pair of valve members, which are concentrically formed on a unitary diaphragm, a portion of which has opposite sides that are pressure equalized when both of the valve elements are in the closed position.

14 Claims, 4 Drawing Figures

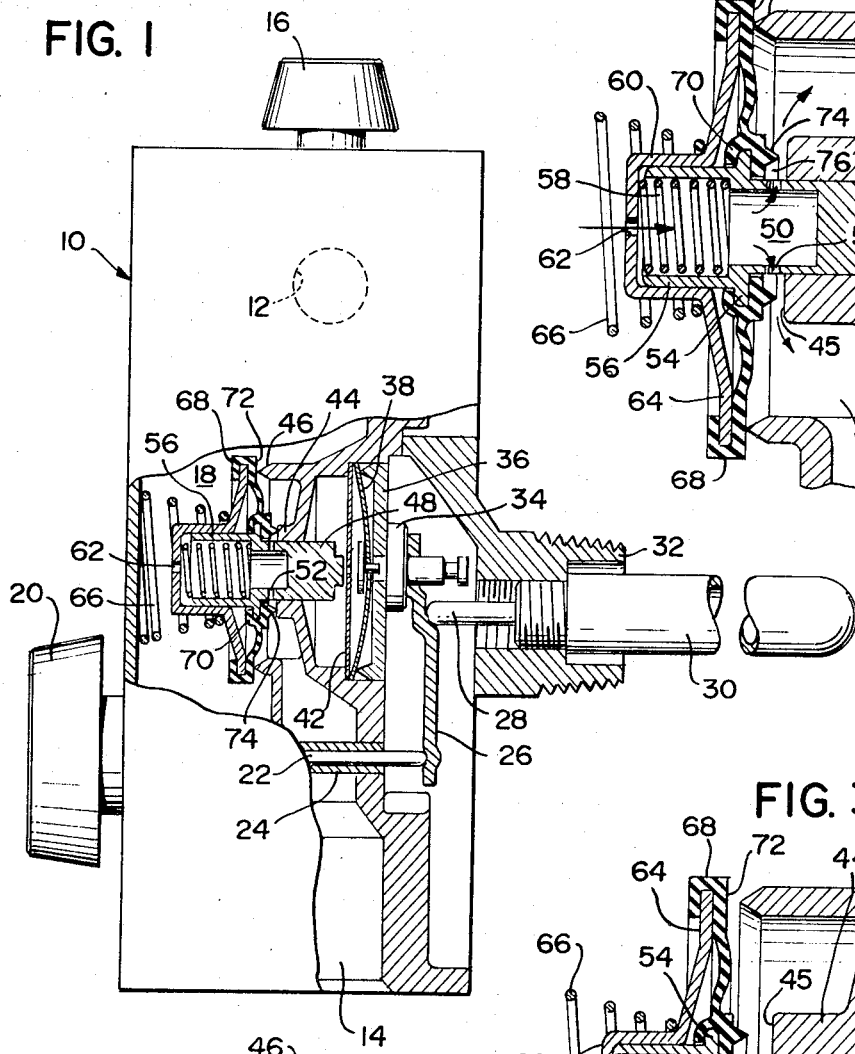
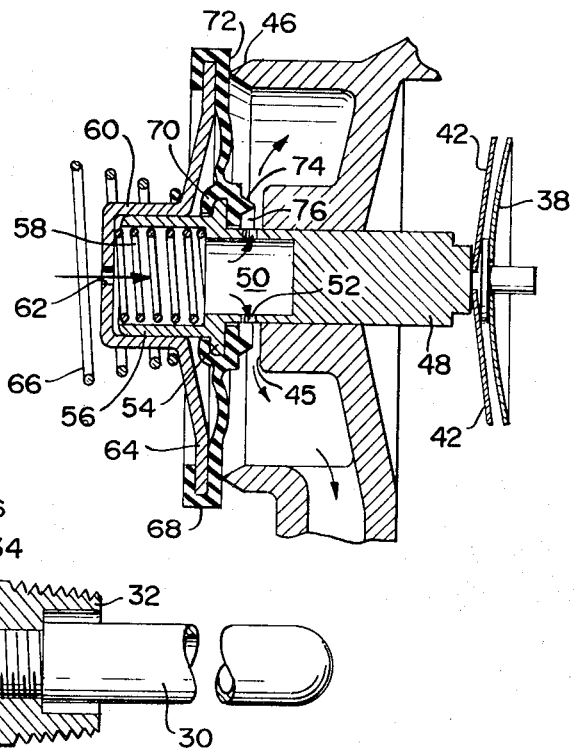
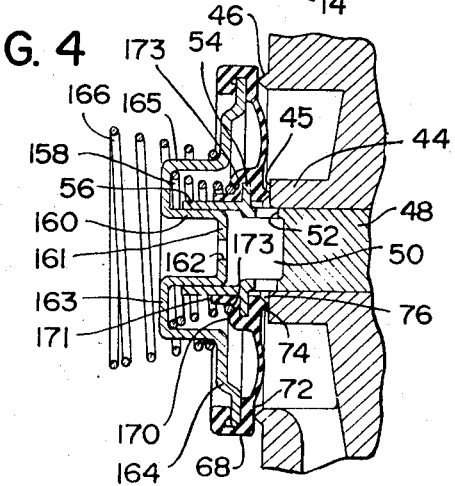
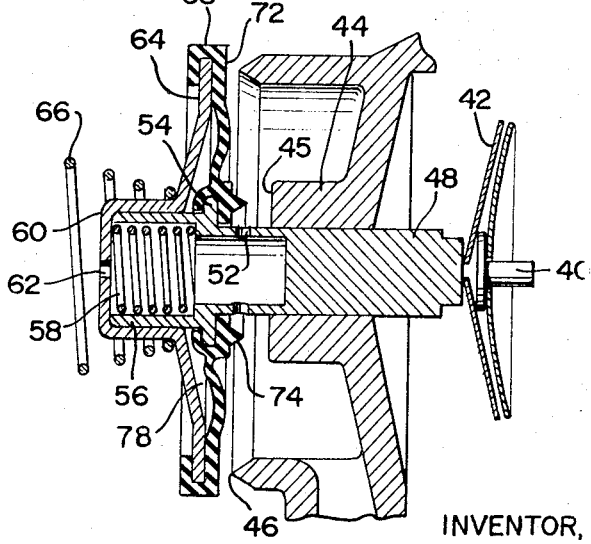

3,642,029

DUAL VALVE CONTROL DEVICE

BACKGROUND OF THE INVENTION

1. Field of the Invention

The present invention relates to a flow control device having a dual valve arrangement sequentially operated to increase the rate of flow.

2. Description of the Prior Art

The prior art is exemplified by U.S. Pat. No. 3,159,346 and U.S. Pat. No. 3,275,035 wherein a flow control device utilizes a pair of serially arranged valves having actuating means to effect initial step control and subsequent modulation control of a flow of fuel in accordance with condition variations, such as temperature variations. Such prior art devices are deemed to be satisfactory for their particular requirements but they have utilized a higher opening force because the valve elements are unbalanced.

SUMMARY OF THE INVENTION

It is, therefore, an object of the present invention to balance the movable valve element of a flow control device having a pair of concentrically arranged valves.

The present invention is summarized in a dual valve control device including a casing having inlet and outlet ports and a flow passage therebetween, a pair of fixed valve seats concentrically arranged in the flow passage, a valve stem having an outer section slidably carried by an inner section, biasing springs exerting a valve closing force on the valve stem, an actuator mechanism operable to exert a valve opening force on the valve stem, the actuating mechanism having an initial movement to cause movement of the inner section and a subsequent movement to cause movement of the outer section, inner and outer movable valve elements attached to the inner and outer sections, respectively, for cooperation with the fixed valve seats to control a fluid flow through the flow passage, and means equalizing the pressure differential across the inner valve element to facilitate movement thereof.

Another object of the present invention is to reduce the force needed to open sequentially a pair of concentrically arranged valves.

This invention has another object in that a resilient diaphragm has an inner portion attached to a section of a valve stem and an outer portion attached to a second section of the valve stem which is slidable on the first section.

Other objects and advantages of the present invention will become apparent from the following description taken in conjunction with the accompanying drawing.

BRIEF DESCRIPTION OF THE DRAWINGS

FIG. 1 is a side elevation view of a thermostatic control device with parts broken away and parts in section embodying the present invention;

FIG. 2 is an enlarged partial section of a detail of FIG. 1 but showing it in another controlling position;

FIG. 3 is similar to FIG. 2 but showing the detail in still another controlling position; and FIG. 4 is an enlarged partial section of a detail similar to FIG. 2 but showing a modification thereof.

DESCRIPTION OF THE PREFERRED EMBODIMENTS

As is illustrated in FIG. 1, the present invention is embodied in a thermostatic control device including a casing, indicated generally at 10, having an inlet port 12 for receiving fuel from a gas source (not shown) and an outlet port 14 for delivering fuel to burner apparatus (not shown). Such control devices conventionally include a second outlet port for delivering a smaller flow of fuel to a pilot burner of the burner apparatus whereby thermostatic cycling thereof is permitted due to the pilot burner flame which effects reignition; a manually resettable thermoelectric safety device is retained in a flow permitting position in response to the pilot burner flame and shuts off all fuel flow upon extinguishment of the pilot burner flame. Since any type of pilot flow control may be utilized, a detailed description is being omitted for the sake of brevity.

The flow of fuel into the casing 10 is controlled by a manually operated on-off valve 16 disposed adjacent the inlet port 12, as is well known in the art; the downstream side of the on-off valve 16 communicates with an inlet chamber 18, from which the fuel flow to the outlet port 14 is thermostatically controlled. A temperature selection dial is mounted on the external end of an adjusting shaft 22 which is threaded through a bushing fixed to a front wall of casing 10. Shaft 22 is axially movable in a sleeve 24 extending across the flow passage adjacent the outlet port 14 and being sealed at both ends. The free end of shaft 22 abuts one end of an operating lever 26.

The thermostat for actuating the lever 26 includes a conventional rod and tube type in which a rod 28 is concentrically disposed in a tube 30. The tube 30 is made of material that has a relatively high coefficient of thermal expansion while the rod 28 is made of material that has a relatively low coefficient of thermal expansion. The tube 30 has a threaded end for fastening it to the mounting shank 32 of the casing 10 and the opposite end of the tube 30 is fixed to the adjacent end of the rod 28 whereby the rod 28 follows the longitudinal movement of the tube 30 due to the thermal expansion and contraction. The free end of the rod 28 engages the lever 26 intermediate its ends while another end of lever 26 engages an operating button 34. It should be noted that any other suitable type of thermostatic means may be utilized to cause movement of lever 26 in response to variations in temperature from a desired set point of the medium in which the tube 30 is disposed.

The operating button 34 engages a snap action mechanism sealingly mounted in a recess on the rear wall of casing 10. As is conventionally utilized in thermostatic control devices, the snap action mechanism includes a fulcrum disc 36 having a flat surface engaged by the operating button 34 and an annular knife edge or fulcrum on its opposite surface adjacent its periphery. A clicker disc 38 has a bowed portion centrally carrying a headed stud 40 (FIG. 3) which is disposed adjacent the central portions of a pair of lever arms 42. For a more detailed description of the snap action mechanism, reference is made to the above mentioned U.S. Pat. No. 3,275,035.

The rear wall recess for the snap action mechanism has a centrally bored, guide bushing 44 having an annular valve seat 45 (FIG. 2) which is concentric with an internal wall of casing 10 that defines a larger annular valve seat 46. The downstream side of the valve seats 45 and 46 define the flow passage leading to the outlet port 14. A valve stem 48 is slidably mounted in the bushing 44 with one end protruding therethrough to be disposed adjacent the ends of the lever arms 42. The opposite end of valve stem 48 is hollowed out to form a flow chamber 50 with sidewall outlet apertures 52 to the outlet flow passage communicating with the outlet port 14. As is shown in FIG. 2, the cylindrical wall of the chamber 50 has an intermediate portion which is enlarged circumferentially forming an annular exterior flange 54 and an interior shoulder joining an outer cylindrical portion 56 of the chamber 50. A coil spring 58 is disposed in the cylindrical portion 56 and mounted in compression between the interior shoulders and the bottom wall of a cup-shaped housing 60 which has an inlet port 62 centrally located on such bottom wall.

The cup-shaped housing 60 is slidably mounted on the cylindrical wall 56 and has an annular flange 64 extending outwardly from its lip portion. A coil spring 66 surrounds the cup housing 60 and is mounted in compression between the flange 64 and the adjacent wall of the casing 10.

A molded diaphragm made of any suitable flexible material, such as rubber, has an outer periphery forming an annular lip 68 that snugly fits over the outer periphery of the flange 64 and an annular lip on its inner periphery snugly fitting over the stem flange 54. Thus, the diaphragm is attached to both of the movable portions of the stem, i.e., the first stem section defined by the cylindrical wall 56 and the second stem section defined by the cup-shaped housing 60. Adjacent its outer edge, the diaphragm defines a movable valve element 72 for cooperation with the fixed valve seat 46; adjacent its inner edge, the diaphragm is provided with a movable valve element 74 which cooperates with the fixed valve seat 45. As is illustrated in FIG. 2, the outlet flow aperture 52 communicates with a balancing chamber 76 defined by the space between the valve seat 45 and the upstream side of the inner valve element 74. A second pressure chamber 78 (FIG. 3) is defined by the movable wall of the diaphragm and the annular flange 64 of the outer stem section; this chamber 78 is in communication with the flow chamber 50 because of the loose sliding fit between the stem section and if desired, sidewall flow ports may be utilized.

In the following description of a sequence of operation of the above dual valve arrangement, it is to be recognized that the actuating means need not be a snap acting mechanism which is operated in response to thermal conditions; however, thermostatic cycling is being utilized for descriptive purposes. During operation of the control device, it is assumed that the manual on-off valve 16 is opened permitting a pilot flow of fuel to a pilot burner which provides a pilot burner flame for ignition of the main flow of fuel during thermostatic cycling. At the same time, there is a main flow of fuel from the inlet port 12 and through the on-off valve 16 to the inlet chamber 18 whence it is controlled thermostatically according to the demand sensed by the thermostat 28–30. In addition, it is assumed that the temperature setting knob 20 has been moved to a selected temperature setting (e.g., 140° F.) which defines the set point that is desired to be maintained in the medium sensed by the thermostat 28–30.

The relative positions of the inner and outer valve elements 74 and 72 in FIG. 1 represent the sensed thermal condition when there is no demand for burner operation; thus, the thermostat 28–30 is in its expanded condition so there is not sufficient force on operating lever 26 to cause actuation of the snap action mechanism. With the two valves 74 and 72 closed on their seats 45 and 46, respectively, there is no fluid flow to the outlet port 14. The fluid flow from the inlet chamber 18 is in a static condition filling the flow chamber 50, the balancing chamber 76 and the chamber 78 by means of the inlet flow aperture 62. As is illustrated in FIG. 1 the chamber 76 is subject to inlet pressure and since the upper surface of the inner valve element 74 is also subject to inlet pressure because of the fluid in the chamber 78, the pressure differential across the inner valve member 74 is equalized with the small inner valve element 74 having both of its sides subject to inlet pressure; except for the pressure force in chamber 50, the movement of the valve stem 48 need only overcome the force of the coil spring 58 and not the force of the coil spring 66. The inner coil spring 58 is a relatively low force spring that biases the valve element 74 towards its closed position. The outer coil spring 66 is a relatively high force spring which biases the outer valve element 72 toward its valve closed position.

As the thermostat 28–30 cools, the tube 30 contracts and the rod 28 is moved inward or to the left as viewed in FIG. 1. The continued inward movement of rod 28 causes the lever 26 to pivot counterclockwise about the end of adjusting shaft 22. The force on the operating button 34 increases moving the fulcrum disc 36 whereby the snap acting disc 38 is moved overcenter and flexed in a direction as shown in FIG. 2.

Such snap action causes the lever arms 42 to move the valve stem 48 through an initial displacement with a snap action. Such initial movement of the valve stem 48 affects a sliding of the outer cylindrical portion 56 against the bias of the coil spring 58. Since the inner valve element 74 moved with the valve stem section 56, the inner valve element 74 is opened so that there is a fluid flow from the chamber 50 through the outlet aperture 52 and passed the valve seat 45 to the outlet port 14. At this point in the operation, the upstream side of the outer stem section 60 is subject to inlet pressure in the inlet chamber 18; however, the flow chamber 50 and the pressure chamber 78 is subject to outlet pressure since the rate of flow therefrom is greater than the inlet rate of flow through the aperture 62. The relatively small flow of fuel from the outlet port 14 to the burner apparatus (not shown) is ignited to supply heat to the medium in which thermostat 28–30 is disposed; if such rate of flow is sufficient to satisfy the demand for the heat as sensed by the thermostat 28–30, the snap mechanism will be released by the thermostat and the inner valve element 74 will be closed with a snap action. If the demand for heat is greater than can be satisfied by the small valve 74, the thermostat 28–30 continues its movement to the left as viewed in FIG. 1. Accordingly, the lever arms 42 of the snap action mechanism are further displaced by the stud 40 causing further movement of the valve stem 48.

This subsequent movement of the valve stem 48 causes opening of the outer valve element 72; i.e., the end of wall 56 of the stem 48 abuts the bottom wall of cup-shaped housing 60 and causes the entire housing to move to the left as is illustrated in FIG. 3, thereby opening the larger valve 72. A larger flow of fuel is now permitted to the outlet port 14. With the additional heat being supplied as a result of the larger valve element 72 being open the thermostat 28–30 will commence to expand whereupon the movement of the snap action mechanism causes the outer valve element 72 to throttle downward from its full open position in FIG. 3. Further expansion of the thermostat 28–30 allows the snap action mechanism to snap overcenter from its position in FIG. 2 to its position in FIG. 1 wherein both valves are closed to shut off the flow of fuel to the burner apparatus.

The above arrangement has the particular advantage that only a light spring force is needed for the valve closing force on the small valve 74. As shown by the relative positions of the cylindrical wall 56 in FIGS. 1 and 2, the movement thereof is not impeded by the high force spring 66 since there is sufficient clearance permitting the snap movement of the inner valve assembly. Thus, the clicker mechanism need only overcome the force of the small closure spring 58. The subsequent movement of the actuating means permits the larger valve 72 to be modulated in accordance with the heat demand. It is also possible that once the heat demand has been satisfied with respect to a high rate of flow of fuel the large valve 72 will close and the subsequent heat demand will be satisfied by off-on operation of the small valve 74 by the snap acting mechanism.

A modification of the dual valve assembly is illustrated in FIG. 4 wherein identical reference numerals are utilized for identical parts described above in conjunction with FIGS. 1–3 and wherein reference numerals with 100 added are utilized for the modified parts which are correlated to those of FIGS. 1–3; accordingly, only structure and function different from FIGS. 1–3 are being described in connection with FIG. 4.

The modification of FIG. 4 includes a cup-shaped housing 160 loosely disposed for guide movement within the cylindrical portion 56; the bottom wall 161 of housing 160 is thus disposed inside the cylindrical portion 56 and has a central aperture 162 establishing communication between the inlet chamber 18 and the flow chamber 50. The left end of housing 160 (as viewed in FIG. 4) has a peripheral annular flange 163 extending radially outwardly and being joined by a cylindrical wall 165 which is disposed in spaced parallel relation to the cylindrical wall defining the housing 160. An annular flange 164 extending outwardly from the lip portion of the cylindrical wall 165 receives the annular lip 68 of the diaphragm.

The spaced cylindrical wall 165 provides a recess receiving a conical coil spring 158 mounted in compression between the annular flange 163 and the diaphragm annular lip 70 which is attached to the stem flange 54. The diaphragm annular lip 170 is provided with a cylindrical extension 171 bearing against the adjacent exterior surface of the cylindrical portion 56; at the point where the inner coil spring bears upon the diaphragm annular lip 170, an annular groove 173 is formed in the diaphragm to receive the smaller end of the coil spring 158. The outer coil spring 166 is mounted in compression like the spring 66 of FIGS. 1–3; i.e., between a wall portion of casing 10.

Operation and function of the modification shown in FIG. 4 are substantially the same as described above in conjunction with FIGS. 1-3 and are not being repeated for the sake of brevity.

However, it should be noted that in FIG. 4, the cylindrical portion 56 of the valve stem 48 is disposed on the exterior surface of the cylindrical wall defining the cup-shaped housing 160 and, accordingly, the coil spring 158 encircles such outer section 56 and bears upon the diaphragm annular lip 170 to aid in holding the diaphragm in assembled relationship. The annular groove 173 aids in retaining the small end of the coil spring 158 on the diaphragm.

Inasmuch as the present invention is subject to many variations, modifications and changes in detail, it is intended that all matter contained in the foregoing description or shown in the accompanying drawings shall be interpreted as illustrative and not in a limiting sense.

I claim:

1. A dual valve control device comprising
   a casing having inlet and outlet means and a flow passage therebetween,
   a pair of fixed valve seats concentrically arranged in said flow passage,
   valve stem means having inner and outer sections movably disposed relative to each other,
   biasing means exerting a valve closing force on said valve stem means,
   actuating means operable to exert a valve opening force on said valve stem means, said actuating means having an initial movement to effect movement of said inner section and a subsequent movement to effect movement of said outer section,
   inner and outer movable valve elements integrally formed on a diaphragm member and being attached to said inner and outer sections, respectively, for cooperation with said fixed valve seats to control a fluid flow through said flow passage, and
   a pair of pressure chambers with one on each side of said inner valve element for equalizing the pressure differential across said inner valve element to facilitate movement thereof,
   said diaphragm member having a portion defining a movable wall of one of said pressure chambers.

2. A dual valve control device as recited in claim 1 wherein said inner section is slidably disposed within said outer section.

3. A dual valve control device as recited in claim 1 wherein said outer section is slidably disposed within said inner section.

4. A dual valve control device as recited in claim 1 wherein said pair of pressure chambers are responsive to inlet pressure when said movable valve elements are closed on their respective fixed valve seats.

5. A dual valve control device as recited in claim 1 wherein said pair of pressure chambers are responsive to outlet pressure when one of said movable valve elements is displaced from its fixed valve seat.

6. A dual valve control device comprising
   a casing having inlet and outlet ports and a flow passage therebetween,
   a pair of fixed valve seats in said flow passage concentrically arranged to define inner and outer valve seats,
   a pair of valve stem sections including an inner section and an outer section movably disposed relative to each other,
   a pair of movable valve elements including an inner valve element on said inner section for movement therewith relative to said inner valve seat and an outer valve element on said outer section for movement therewith relative to said outer valve seat,
   spring means biasing said valve stem sections to valve closed positions,
   actuating means having initial and subsequent movements for displacement of said inner and outer sections, respectively, to valve open positions,
   a flow chamber in said inner section,
   said inner section of the stem having a flow chamber with an outlet flow aperture communicating with said flow passage downstream of said fixed valve seats and with inlet flow means communicating with said flow passage upstream of said fixed valve seats, and
   means defining a pressure chamber between said outlet flow aperture and said inner valve element when the same is closed on said inner valve seat to equalize the pressure differential across said inner valve element whereby opening movement thereof is facilitated.

7. A dual valve control device as recited in claim 6 wherein said spring means includes a relatively high force spring acting on said outer section and a relatively low force spring acting on said inner section, and wherein said actuating means first overcomes the force of said low force spring to open said inner valve element and subsequently overcomes the force of said high force spring to open said outer valve element.

8. A dual valve control device as recited in claim 7 wherein said actuating means comprises a snap-acting mechanism and the initial movement thereof is a snap action to open said inner valve element with a snap action.

9. A dual valve control device as recited in claim 8 wherein the subsequent movement of said snap-acting mechanism is a modulating action to modulate said outer valve element.

10. A dual valve control device as recited in claim 7 wherein the outer section of said stem includes a cup-shaped member and wherein said low force spring is a coil spring compressed between portions of said inner and outer sections.

11. A dual valve control device as recited in claim 10 wherein said cup-shaped member has a peripheral flange and wherein said inner and outer valve members are integrally formed on a resilient diaphragm having inner and outer portions secured to said inner section and said peripheral flange, respectively.

12. A dual valve control device as recited in claim 11 wherein the inner section of said stem is slidably disposed within said cup-shaped member and said coil spring is disposed interiorly of said inner section.

13. A dual valve control device as recited in claim 11 wherein the inner section of said stem is slidably disposed exteriorly of said cup-shaped member and said coil spring is disposed exteriorly of said inner section.

14. A dual valve control device as recited in claim 13 wherein said coil spring has one end bearing against the inner portion of said diaphragm to retain the same on the inner section of said stem.

* * * * *